United States Patent
Misra et al.

(10) Patent No.: US 11,449,356 B2
(45) Date of Patent: Sep. 20, 2022

(54) SYSTEMS AND METHODS FOR TRANSACTION TRACING WITHIN AN IT ENVIRONMENT

(71) Applicant: GalaxE.Solutions, Inc., Somerset, NJ (US)

(72) Inventors: Dheeraj Misra, Somerset, NJ (US); Sandipan Gangopadhyay, Somerset, NJ (US); Tim Bryan, Somerset, NJ (US)

(73) Assignee: GalaxE.Solutions, Inc., Somerset, NJ (US)

(*) Notice: Subject to any disclaimer, the term of this patent is extended or adjusted under 35 U.S.C. 154(b) by 150 days.

(21) Appl. No.: 16/746,455

(22) Filed: Jan. 17, 2020

(65) Prior Publication Data

US 2020/0233697 A1 Jul. 23, 2020

Related U.S. Application Data

(60) Provisional application No. 62/794,349, filed on Jan. 18, 2019.

(51) Int. Cl.
*G06F 9/46* (2006.01)
*G06F 11/34* (2006.01)

(52) U.S. Cl.
CPC .......... *G06F 9/466* (2013.01); *G06F 11/3471* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 7,194,664 B1 * | 3/2007 | Fung | G06F 11/3636 714/32 |
| 7,783,549 B1 | 8/2010 | Benson et al. | |
| 2006/0294151 A1 * | 12/2006 | Wong | G06F 16/25 |
| 2013/0145015 A1 * | 6/2013 | Malloy | G06F 11/3495 709/224 |
| 2013/0290244 A1 * | 10/2013 | Nucci | G06F 16/2365 707/609 |
| 2014/0149803 A1 | 5/2014 | Lehofer et al. | |
| 2015/0205846 A1 | 7/2015 | Aldridge et al. | |
| 2016/0105347 A1 | 4/2016 | Rochette | |
| 2016/0291972 A1 | 10/2016 | Bryan | |
| 2019/0340103 A1 * | 11/2019 | Nelson | G06F 11/3624 |

OTHER PUBLICATIONS

PCT/US2020/014152, International Search Report (PCT/ISA/210 and PCT/ISA/220) dated Apr. 9, 2020, enclosing Written Opinion of the International Searching Authority (PCT/ISA/237) (Eight (8) pages).

(Continued)

*Primary Examiner* — Qing Chen
(74) *Attorney, Agent, or Firm* — Crowell & Moring LLP

(57) ABSTRACT

A system for tracing transactions includes a system mapping engine configured to generate a multi-tier control point map based on source code and transaction data of one or more source systems; and a tracing engine configured to trace transactions across the one or more source systems based on the multi-tier control point map. The multi-tier control point map provides end-to-end transaction traceability.

8 Claims, 3 Drawing Sheets

(56) References Cited

OTHER PUBLICATIONS

Zhang et al., "Precise request tracing and performance debugging for multi-tier services of black boxes", 2009 IEEE/IFIP International Conference on Dependable Systems & Networks, Jul. 2, 2009, URL: https://arxiv.org/ftp/arxiv/papers/1003/1003.0955.pdf (Ten (10) pages).
International Preliminary Report on Patentability (PCT/IB/326 and PCT/IB/373) and Written Opinion (PCT/ISA/237) dated Jul. 29, 2021 (Seven (7) pages).

* cited by examiner

SYSTEMS AND METHODS FOR TRANSACTION TRACING WITHIN AN IT ENVIRONMENT

CROSS-REFERENCE TO RELATED APPLICATIONS

This application claims the benefit of U.S. Provisional Application No. 62/794,349, filed on Jan. 18, 2019, the entire contents of which are hereby incorporated by reference.

BACKGROUND OF THE INVENTION

Modern day regulatory compliance requirements are becoming more complex and challenging for large enterprises to meet. These enterprises typically rely on IT environments that include various disparate systems and technology platforms across different tiers of its architecture. The intricate interdependencies between these platforms is usually not well documented nor well understood due to the complex nature of the integrations between applications and systems.

In addition, during compliance auditing, it is often necessary to track a large number of process steps and related data inputs and outputs. This increases the risk of introducing human error in developing compliance models, which in turn results in multiple challenges in terms of reliability. As such, developing compliance models has typically been labor and cost intensive. With evolving business needs, the architectural complexity behind the enterprise IT environment increases over time, further exasperating the problem. Moreover, compliance activates traditionally base findings on after the fact audits and not real time information, which represents a significant opportunity cost for enterprises.

In order to overcome the above challenges and to move the subject matter expertise to a systematic level, the enterprise should be able to easily and quickly trace transactions across and among different systems and technologies within the IT environment. Moreover, such end-to-end tracing of the transactions should be interactively visualized, and failure points within the IT environment should be easily and quickly identified and addressed through the tracing.

In that regard, a system and method for transaction tracing within an IT environment is disclosed herein, which overcomes these and other shortcomings of prior systems and/or methods.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

DETAILED DESCRIPTION OF EMBODIMENTS OF THE INVENTION

Figure 1:
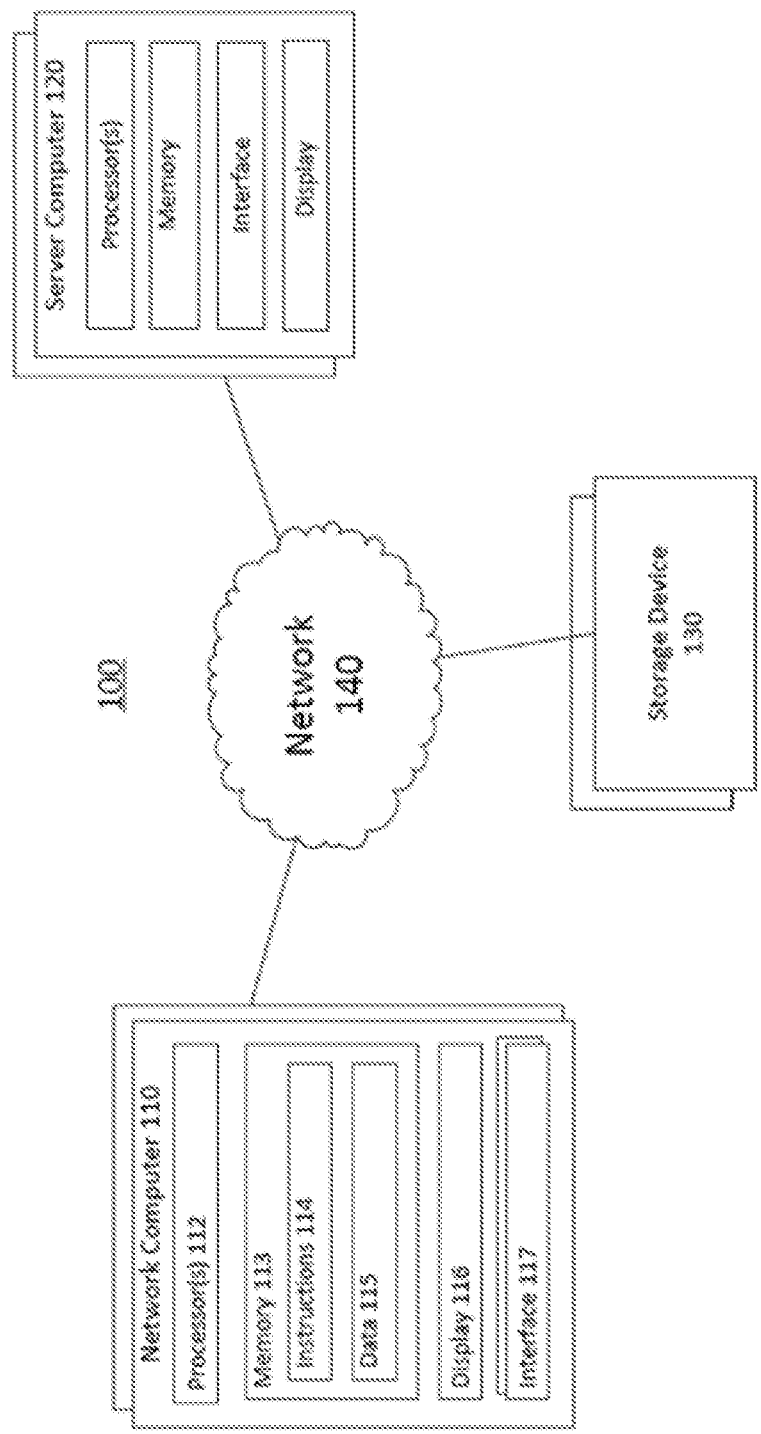
FIG. 1 illustrates an example system in accordance with one or more aspects of the disclosure.

The disclosure is directed to transaction tracing within an IT environment. A system and method for tracing transactions within an IT environment is described herein. An interactive dashboard is utilized to trace transactions within an IT environment.

Automated parsing techniques are used to identify dependencies between and among different business applications, use cases, transactions, data elements and code assets, within the IT environment, from which a multi-tier control point map is built that, for each tier, map the IT environment across the different systems and technologies of the IT environment. The multi-tier control point map is used to trace transactions within the IT environment across the one or more systems and technologies. The end-to-end tracing of the transactions is interactively visualized, and failure points within the control point map are identified through the tracing and addressed.

The present disclosure provides a number of benefits and/or advantages over prior methods. For example, as a result of the multi-tier control point map, the end-to-end tracing does not require reliance on reference identifications for tracing the transactions, and may be accomplished separately from the systems being observed. As such, end-to-end tracing may be achieved by way of an online, i.e., a synchronous, process, or in a queued/batch, i.e., an asynchronous, process. Also, little to no additional overhead may be introduced to the systems being observed.

An additional benefit and/or advantage may be found in enabling the review and defining of control points for regulatory guidelines and client demands, and/or the defining and implementing of automated control points, monitoring and alerts, and reconciliation framework and automation to meet statutory requirements. As such, an audit ready framework may be provided, which may include regulatory data stores, an audit universe for ad hoc and regulatory investigations, a reconciliation of compliance mapping, end-to-end traceability of system record entries, and audit compensating controls for all system hand-offs.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

FIG. 1 illustrates an example system 100 in accordance with one or more aspects of the disclosure. System 100 may include a plurality of computers and/or computing devices, such as, network computer 110, server computer 120, and storage device 130. By way of example only, network computer 110 is connected to network 140 and may include different types of components associated with a computer, such as one or more processors 112, memory 113, instructions 114, data 115, display 116, and an interface 117. The network computer 110 may be mobile (e.g., laptop computer, tablet computer, smartphone, PDA, etc.) or stationary (e.g., desktop computer, etc.). Similarly, server computer 120 may also include one or more processors, memory, interface, and/or display and may be configured to communicate with other computer devices on system network 140.

The processor 112 of network computer 110 may instruct the components thereof to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores at least instructions 114 and/or data 115 that can be accessed by processor 112. For example, memory 113 may be hardware capable of storing information accessible by the processor, such as a ROM, RAM, hard-drive, CD-ROM, DVD, write-capable, read-only, etc. The set of instructions may be included in software that can be implemented on the network computer 110 and should be noted that the terms "instructions," "steps," "algorithm," and "programs" may be used interchangeably. Data 115 can be retrieved, manipulated or stored by the processor 112 in accordance with the set of instructions 114 or other sets of executable instructions. The data 115 may be stored as a collection of data.

The display 116 may be any type of device capable of communicating data to a user, such as a liquid-crystal display ("LCD") screen, a plasma screen, etc. Interface 117 allow a user to communicate with the network computer 110 and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer 120 (and additional server computers) may be rack mounted on a network equipment rack and/or located, for instance, in a data center. In one example, the server computer 120 may use the system network 140 to serve the requests of programs executed on network computer 110 and/or storage device 130.

The storage device 130 illustrated in FIG. 1 may be configured to store large quantities of data and/or information. For example, the storage device 130 may be a collection of storage components, or a mixed collection of storage components, such as ROM, RAM, hard-drives, solid-state drives, removable drives, network storage, virtual memory, cache, registers, etc. The storage device 130 may also be configured so that the network computer 110 and/or server computer 120 may access it via the system network 140.

The system network 140 may be any type of network, wired or wireless, configured to facilitate the communication and transmission of data, instructions, etc. from one component to another component of the network. For example, the network 140 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the network configuration illustrated in FIG. 1 serves only as an example and is thus not limited thereto. System 100, for instance, may include numerous other components connected to system network 140, include more than one of each network component (as shown by the cascaded blocks), and system network 140 may be connected to other networks, such as an external network 210 (shown in FIG. 2).

Figure 2:
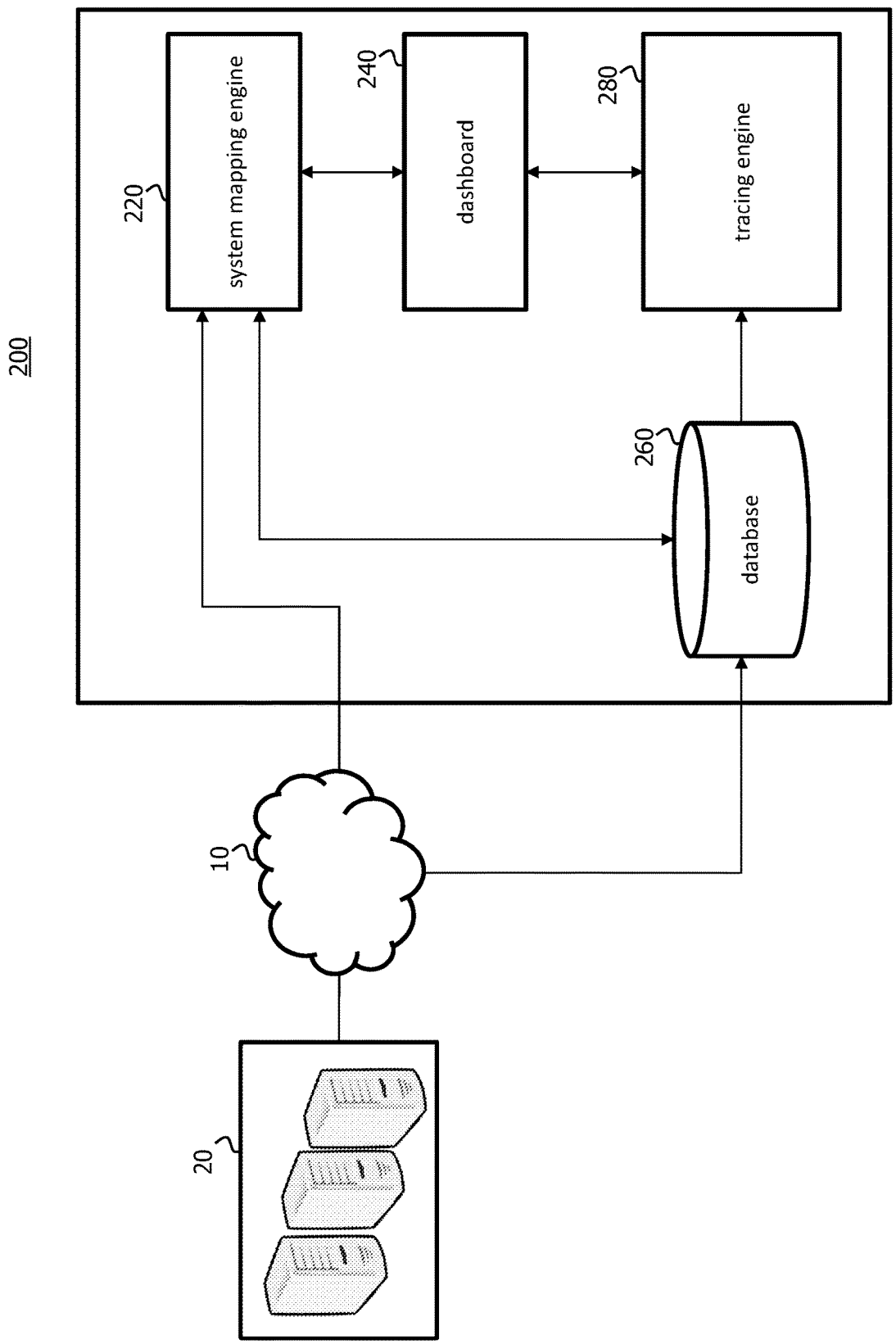
FIG. 2 illustrates a diagram of the architecture in accordance with one or more aspects of the disclosure.

FIG. 2 illustrates one embodiment of an exemplary architecture 200 for transaction tracing within an IT environment. The architecture 200, as shown in FIG. 2, includes a system mapping engine 220, a dashboard 240, a database 260 and a tracing engine 280, each including software and/or hardware modules enabling the functions thereof. In addition, the architecture 200 is connected via external network 10 to one or more source systems 20 of an enterprise IT environment.

One example of the operation of the system architecture shown in FIG. 2 is as follows. Source code and database reflecting the current state of one or more source systems of the IT environment, and transaction data reflecting transactions within and across the one or more source system, is provided from the one or more source systems 20 to the system mapping engine 220, which may utilize automated parsing techniques to identify dependencies between and among different business applications, use cases, transactions, data elements and code assets, within and among the source systems of the IT environment. The system mapping engine 220 then analyzes the information and determines links between and among the parsed information, from which a multi-tier control point map is built that, for each tier, maps the IT environment across the different systems, technologies and workflows of the IT environment. These links and/or the generated multi-tier control point map are saved in the database 260 for later reference.

The multi-tier control point map may establish the traceability of records within and/or across multiple source systems, technologies and work flows. Accordingly, the multi-tier control point map, which is generated from the parsed source data, may map records across otherwise disparate systems and/or processes. For example, the multi-tier control point map may map each node of a workflow to a system, department, administrator, executable code segment, etc. and to other preceding and subsequent nodes in the workflow based on a call-hierarchy analysis.

Exemplary automated parsing and cross-application dependency mapping techniques that may be utilized are disclosed, for example, in U.S. application Ser. No. 15/087,786, entitled "System and method for Automated Cross-Application Dependency Mapping," filed on Mar. 31, 2016, the contents of which are incorporated herein by reference in its entirety. It will be understood, however, that unique mappings for each system and system transition may be undertaken.

In at least one embodiment, match and merge techniques may be utilized to generate the multi-tier control point map via a determination of how transactions process from node-to-node of the workflow. As such, the source data may include transaction records, from which a transaction workflow may be determined.

One or more golden records may be created from the transaction records of the source systems 20. In particular, a series order of attributes may be utilized to group transaction records according to the attributes, e.g., client name, application number, case number, SKU, account number, etc. The attributes may vary depending on the type of enterprise and should not be viewed as limiting. The grouping, for example, is such that transaction records appearing by their attributes to pertain to each other are grouped together. For example, where transaction records from different source systems have the same client name attribute, they likely pertain to each other.

The groupings may then be sorted in accordance with a priority order, based on their attributes. Such priority order may take into account, for example, a confidence level in the grouping, age of the records, or any other attribute.

A golden record may then be created for each group of transaction records. The golden record is a term of art that reflects a complete, accurate and consistent collection of the transaction records into the golden record. Thus, the golden record is an collective record reflecting the "truth" of the transaction described by the group of transaction records.

The golden records may then be utilized to identify other golden records whose attributes indicate the golden records pertain to linked transactions. For example, a first golden record may indicate a transaction associated with a case between a first and second node, whereas the second golden record may indicate a subsequent transaction associated with the case between the second node and a third node. The golden records may therefore be linked across various systems and technologies to establish traceability of the transaction records across such systems and technologies (e.g., different system management software, data fields, etc.). Accordingly, the golden records for various interlinked transactions are tied together, e.g., via their attributes, to generate the multi-tier control point map structure that enables transaction tracing across disparate systems.

The multi-tier control point map may be accessed by the user through the input/output device, such as a GUI of the network computer 110 and/or the server computer 120, as illustrated in FIG. 1, via the dashboard 240. By way of example, the multi-tier control point map may be used, or may be further depended on by other network computers, to maintain, modify, and/or enhance the various applications that are associated with the IT environment, perform system audits, create alerts and notifications, and generate reports and statistical analyses. For instance, the multi-tier control point map may be used to generate service reports for particular end users, customers, and/or consumers, which may be a series of reports on the various control point tiers associated with the IT environment. These service reports may provide detailed analysis of the tiers and the overall impact and/or implications on the IT environment. In one example, a service report may be in digital format and may be utilized on one or more GUIs by the end user, customers, and/or consumers to, for example, proactively mitigate process flaws, delays and other issues; provide rapid corrective action that is auditable, repeatable and automated; proactively assess process/organizational needs in the past, current and future; and facilitate rapid root-cause analysis of issues before they are visible to users and other stakeholders.

The dashboard 240 may further be utilized by the user for end-to-end tracing of transactions across the one or more systems and technologies based on the multi-tier control point map. The multi-tier control point map (and service reports generated therefrom) may, for example, be used to trace the transactions for issues of completeness, i.e., where expected transactions did not occur. For example, a department may have received six enrollment requests, but only may have only sent the information for five requests onto the next department for further processing. The multi-tier control point map may thus be utilized to determine nodes that are not performing as expected. The multi-tier control point map may, for example, be used to trace transactions for issues of timeliness. Based on the timestamps of the transactions, the multi-tier control point map can be used to identify the timeliness of the common node (e.g., how long a given department took to act). The multi-tier control point map may, for example, be used to trace transactions for issues of accuracy. For example, based on the details of a given transaction record, it should not show up as associated with a node (e.g., a department or system) that is different from what is expected.

In accordance with end-to-end tracing, transaction data reflecting transactions within and across the one or more source systems 20 is provided from the one or more source systems 20 to the database 260, which information is retrieved and utilized by the tracing engine 280 to trace transactions across the one or more systems and technologies based on the multi-tier control point map. In addition, the end-to-end tracing of the transactions may be interactively visualized, using the multi-tier control point map, via the dashboard 240. As such, failure points within the control point map may be identified through the tracing and addressed.

The transaction data includes data related to different categories or phases of the transactions, for example, data related to intake channels (e.g., IVR, rejected claim, facsimile, etc.), requests sources (e.g., inbound facsimile, CSR work queue, claim details, etc.), sources of truth (e.g., stub cases, PA cases, case activities (e.g., primary, secondary and appeal), etc.), processing (e.g., work queue, additional activity information, work information, work assignment, etc.), and completion (e.g., outbound letters/faxes, auto messaging, authorizations, etc.). Using the multi-tier control point map, the transaction data may be reconciled between and among categories, based on which one or more reports may be generated. As such, the end-to-end tracing does not require reliance on reference identifications for tracing the transactions.

It will be understood that the end-to-end tracing is accomplished separately from the one or more systems 20 being observed. As such, end-to-end tracing may be achieved by way of an online, i.e., a synchronous, process, or in a queued/batch, i.e., an asynchronous, process. Also, little to no additional overhead may be introduced to the one or more systems 20 being observed.

Further capabilities of the dashboard 240 may also be realized in connection with the end-to-end traceability for the transactions. For example, the dashboard 240 may be configured to enable the review and defining of control points for regulatory guidelines and client demands, and/or the defining and implementing of automated control points, monitoring and alerts, and reconciliation framework and automation to meet statutory requirements. Compensation controls may also be provided, as well as pattern analysis for exception processing. As such, an audit ready framework may be provided, which may include regulatory data stores, an audit universe for ad hoc and regulatory investigations, a reconciliation of compliance mapping, end-to-end traceability of system record entries, and audit compensating controls for all system hand-offs.

Figure 3:
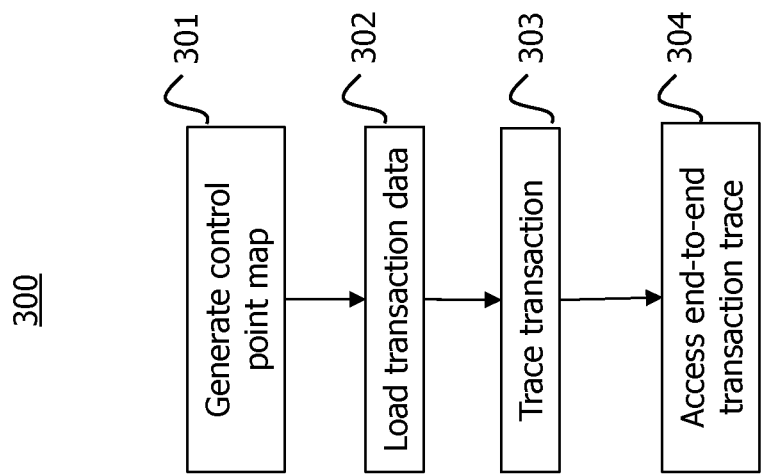
FIG. 3 illustrates a flow diagram of an algorithm used by the architecture of FIG. 2 in accordance with one or more aspects of the disclosure.

As described above, FIG. 3 illustrates a flow-diagram 300 of an algorithm used by the architecture of FIG. 2 in accordance with one or more aspects of the disclosure.

As shown, at step 301, the multi-tier control point map is generated, based on source code and database of the one or more source systems 20, which multi-tier control point map is saved to the database 260.

At step 302, transaction data, reflecting transactions within and across the one or more source systems 20 is provided from the one or more source systems 20 to the database 260.

At step 303, the transaction data is utilized by the tracing engine 280 to trace transactions across the one or more systems and technologies based on the multi-tier control point map, which end-to-end trace of the transaction, and related functionalities, are accessible via the dashboards 240 at step 304.

In accordance with foregoing embodiments, examples, and/or aspects of the invention, all dependencies between functions and transactions across system, technology and application boundaries are identified. For any function or transaction, it is possible to identify all relevant callers across application boundaries at any point in time. End-to-end traceability of functions, transactions, or services across system, technology and application boundaries is provided.

In a further aspect of the disclosure, as discussed herein, an easy-to-use, intuitive GUI is provided that includes the dashboard 240 that permits a user to view end-to-end traceability of relevant functions, transactions, or services, and to view and navigate between the tiers of the multi-tier control point map. Links may be provided within the GUI that can be clicked by a user in order to navigate directly to and between the relevant code, use case, test case, or business rule of a given transaction.

It will be understood that the aspects described herein have application in several fields. For example, in the retail field aspects of the invention enable end-to-end reconciliation of item, inventory and order fulfillment. In addition, due to the traceability of transactions, root causes of issues (e.g., non-fulfillment of an order) may be identified across otherwise disparate systems, departments, etc. Dependency maps between upstream and downstream systems may also be provided.

In such embodiments, for example, sales orders, catalog information, and inventory may be received from one or more source systems (e.g., e-commerce sites, master data management systems, inventory reports from delivery channels, etc.). The subsequently generated multi-tier control point map therefore reconciles such data across the source systems. The generated reports assist users in identifying root causes of issues, for example, when there is a discrepancy between inventory and fulfillment. The generated reports also assist users in tracking the end-to-end sales order life cycle.

While certain exemplary embodiments have been described and shown in the accompanying drawings, it is to be understood that such embodiments are merely illustrative of and not restrictive on the broad inventions, and that this inventions not be limited to the specific constructions and arrangements shown and described, since various other modifications may occur to those ordinarily skilled in the art.

The invention claimed is:

1. A system for tracing transactions between and among source systems, the system comprising:
a system mapping engine configured to:
receive parsed source code and transaction data of one or more source systems having different system management software,
identify transaction records from the parsed source code and the transaction data of the one or more source systems,
wherein the transaction records are between the one or more source systems,
group the transaction records so as to generate a golden record for each group of transaction records,
identify golden records whose attributes indicate linked transactions across the one or more source systems, and
generate a multi-tier control point map based on the linked transactions across the one or more source systems; and
a tracing engine configured to:
trace the linked transactions across the one or more source systems based on the multi-tier control point map, wherein the multi-tier control point map provides end-to-end transaction traceability,
identify one or more failure points for completeness, timeliness, and/or accuracy of the linked transactions across the one or more source systems, from the trace of the linked transactions across the one or more source systems, and
create one or more alerts and/or notifications based on the identified one or more failure points for completeness, timeliness, and/or accuracy of the linked transactions across the one or more source systems.

2. The system of claim 1, further comprising:
a dashboard configured to provide user navigation among tiers of the multi-tier control point map.

3. The system of claim 1, wherein the system mapping engine generates the multi-tier control point map via match-and-merge techniques.

4. The system of claim 1, wherein the transaction data of the one or more source systems includes transaction records, and wherein the multi-tier control point map links golden records of grouped transaction records.

5. A method for tracing transactions between and among source systems, the method comprising:
receiving, by a system mapping engine, parsed source code and transaction data of one or more source systems having different system management software;
identifying, la the system mapping engine, transaction records from the parsed source code and the transaction data of the one or more source systems, wherein the transaction records are between the one or more source systems;

grouping, la the system mapping engine, the transaction records so as to generate a golden record for each group of transaction records;

identifying, la the system mapping engine, golden records whose attributes indicate linked transactions across the one or more source systems;

generating, by the system mapping engine, a multi-tier control point map based on the linked transactions across the one or more source systems;

tracing, by a tracing engine, the linked transactions, across the one or more source systems based on the multi-tier control point map, wherein the multi-tier control point map provides end-to-end transaction traceability;

identifying, by the tracing engine, one or more failure points for completeness, timeliness, and/or accuracy of the linked transactions across the one or more source systems, from the trace of the linked transactions across the one or more source systems; and creating, by the tracing engine, one or more alerts and/or notifications based on the identified one or more failure points for completeness, timeliness, and/or accuracy of the linked transactions across the one or more source systems.

6. The method of claim 5, further comprising:
providing, via a dashboard, user navigation, among tiers of the multi-tier control point map.

7. The method of claim 5, wherein the multi-tier control point map is generated via match-and-merge techniques.

8. The method of claim 5, wherein the transaction data of the one or more source systems includes transaction records, and wherein the multi-tier control point map links golden records of grouped transaction records.

* * * * *